(12) United States Patent
MacIntosh et al.

(10) Patent No.: US 9,292,894 B2
(45) Date of Patent: Mar. 22, 2016

(54) CONTENT RECOGNITION AND SYNCHRONIZATION USING LOCAL CACHING

(71) Applicant: Digimarc Corporation, Beaverton, OR (US)

(72) Inventors: Brian T. MacIntosh, Lake Oswego, OR (US); Tony F. Rodriguez, Portland, OR (US); Ravi K. Sharma, Portland, OR (US); Matthew M. Weaver, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 255 days.

(21) Appl. No.: 13/804,314

(22) Filed: Mar. 14, 2013

(65) Prior Publication Data

US 2013/0308818 A1 Nov. 21, 2013

Related U.S. Application Data

(60) Provisional application No. 61/610,988, filed on Mar. 14, 2012.

(51) Int. Cl.
*H04N 21/44* (2011.01)
*H04N 21/43* (2011.01)
*G06T 1/00* (2006.01)
*H04N 21/462* (2011.01)

(52) U.S. Cl.
CPC .......... *G06T 1/0021* (2013.01); *H04N 21/4307* (2013.01); *H04N 21/44008* (2013.01); *H04N 21/4622* (2013.01)

(58) Field of Classification Search
CPC .......... G06T 1/0021; H04N 21/44008; H04N 21/4622; H04N 21/4307
USPC .......................................................... 707/600
See application file for complete search history.

(56) References Cited

U.S. PATENT DOCUMENTS

| | | | |
|---|---|---|---|
| 4,230,990 | A | 10/1980 | Lert et al. |
| 5,210,820 | A | 5/1993 | Kenyon |
| 6,411,725 | B1 | 6/2002 | Rhoads |
| 6,834,308 | B1 | 12/2004 | Ikezoye et al. |
| 6,990,453 | B2 | 1/2006 | Wang et al. |
| 7,168,083 | B2 | 1/2007 | Kalker et al. |
| 7,174,293 | B2 | 2/2007 | Kenyon et al. |

(Continued)

FOREIGN PATENT DOCUMENTS

| | | |
|---|---|---|
| WO | WO2011017539 | 2/2011 |
| WO | WO2012028851 | 3/2012 |

OTHER PUBLICATIONS

Bhat, D. N. and Nayar, S. K., "Ordinal measures for image correspondence," IEEE Trans. Pattern Ana. mach. Intell., vol. 20, No. 4, pp. 415-423, Apr. 1998.

(Continued)

*Primary Examiner* — Phuong Thao Cao
(74) *Attorney, Agent, or Firm* — Digimarc Corporation (57) ABSTRACT

A content fingerprint based recognition system employs local caching of portions of a fingerprint database to manage network services for identifying which programs a user's mobile device is exposed to and the timing of events within the program. The system enables background recognition and synchronization of network services in a way that consumes less device power and bandwidth.

14 Claims, 3 Drawing Sheets

(56) References Cited

U.S. PATENT DOCUMENTS

| | | |
|---|---|---|
| 7,284,255 B1 | 10/2007 | Apel et al. |
| 7,289,643 B2 | 10/2007 | Brunk et al. |
| 7,346,472 B1 | 3/2008 | Moskowitz et al. |
| 7,346,512 B2 | 3/2008 | Li-Chun Wang et al. |
| 7,412,072 B2 | 8/2008 | Sharma et al. |
| 7,783,489 B2 | 8/2010 | Kenyon et al. |
| 7,870,574 B2 | 1/2011 | Kenyon et al. |
| 8,171,030 B2 | 5/2012 | Pereira et al. |
| 8,300,884 B2 | 10/2012 | Sharma |
| 8,332,059 B2* | 12/2012 | Herre .................... G10L 19/008 370/350 |
| 8,396,705 B2 | 3/2013 | Bilobrov |
| 8,488,838 B2 | 7/2013 | Sharma |
| 8,516,533 B2 | 8/2013 | Davis et al. |
| 8,838,657 B1* | 9/2014 | Malone ............ G06F 17/30011 707/609 |
| 9,071,868 B2* | 6/2015 | Neumeier .......... H04N 5/44591 |
| 2001/0041060 A1* | 11/2001 | Ohara et al. .................. 386/111 |
| 2002/0178410 A1 | 11/2002 | Haitsma et al. |
| 2003/0037010 A1 | 2/2003 | Schmelzer |
| 2003/0163823 A1* | 8/2003 | Logan et al. ..................... 725/89 |
| 2004/0073949 A1* | 4/2004 | Chen et al. ..................... 725/135 |
| 2006/0031684 A1 | 2/2006 | Sharma et al. |
| 2006/0146787 A1* | 7/2006 | Wijnands ............... H04H 60/46 370/352 |
| 2006/0280246 A1 | 12/2006 | Alattar et al. |
| 2007/0220265 A1 | 9/2007 | Lemma et al. |
| 2007/0234213 A1* | 10/2007 | Krikorian et al. ............. 715/716 |
| 2008/0051029 A1* | 2/2008 | Witteman ............... G11B 27/28 455/17 |
| 2008/0062315 A1* | 3/2008 | Oostveen ................ G10L 25/48 348/500 |
| 2008/0082510 A1* | 4/2008 | Wang ..................... H04H 60/37 |
| 2008/0089551 A1* | 4/2008 | Heather ................. H04N 21/235 382/100 |
| 2008/0154401 A1* | 6/2008 | Wang ..................... G11B 27/11 700/94 |
| 2008/0250240 A1 | 10/2008 | Celik et al. |
| 2008/0307470 A1* | 12/2008 | Kanayama ..................... 725/100 |
| 2009/0044224 A1* | 2/2009 | Hymel ............................ 725/46 |
| 2010/0095326 A1* | 4/2010 | Robertson, III ................ 725/40 |
| 2010/0169911 A1* | 7/2010 | Zhang ............................ 725/19 |
| 2010/0280641 A1 | 11/2010 | Harkness et al. |
| 2011/0080958 A1* | 4/2011 | Sprljan ..................... G06T 9/00 375/240.25 |
| 2011/0273455 A1* | 11/2011 | Powar ............... G06F 17/30769 345/473 |
| 2011/0276157 A1* | 11/2011 | Wang ............... G06F 17/30861 700/94 |
| 2011/0276333 A1* | 11/2011 | Wang ............... G06F 17/30861 704/270 |
| 2011/0276334 A1* | 11/2011 | Wang ............... G06F 17/30861 704/270 |
| 2011/0283306 A1 | 11/2011 | Davis et al. |
| 2011/0288862 A1 | 11/2011 | Todic |
| 2012/0020647 A1* | 1/2012 | Vogel ............................ 386/251 |
| 2012/0029670 A1* | 2/2012 | Mont-Reynaud . G06F 17/30743 700/94 |
| 2012/0095958 A1* | 4/2012 | Pereira ................ G06F 17/3002 707/609 |
| 2012/0110627 A1 | 5/2012 | Reitmeier et al. |
| 2012/0239175 A1* | 9/2012 | Mohajer ........... G06F 17/30743 700/94 |
| 2012/0240151 A1* | 9/2012 | Tapper ............... H04N 21/4104 725/32 |
| 2012/0311074 A1* | 12/2012 | Arini ................ H04N 21/44008 709/217 |
| 2013/0057761 A1* | 3/2013 | Bloom ..................... H04N 5/04 348/515 |
| 2013/0111514 A1* | 5/2013 | Slavin ................... H04H 60/64 725/18 |
| 2013/0139209 A1* | 5/2013 | Urrabazo ........... H04N 21/4828 725/109 |
| 2013/0160038 A1* | 6/2013 | Slaney ................ H04N 21/233 725/14 |
| 2013/0202150 A1* | 8/2013 | Sinha ..................... G06T 1/0021 382/100 |
| 2013/0205338 A1* | 8/2013 | Sinha et al. ...................... 725/34 |
| 2013/0246457 A1* | 9/2013 | Stojancic .......... G06F 17/30023 707/769 |
| 2013/0290502 A1* | 10/2013 | Bilobrov ................ G06F 21/10 709/223 |
| 2013/0308818 A1* | 11/2013 | MacIntosh ............ G06T 1/0021 382/100 |
| 2013/0340011 A1 | 12/2013 | Rodriguez |
| 2014/0012572 A1* | 1/2014 | Herberger et al. ............ 704/231 |
| 2014/0059587 A1 | 2/2014 | Davis et al. |
| 2014/0059591 A1 | 2/2014 | Terpstra et al. |
| 2014/0082655 A1* | 3/2014 | Moon et al. ...................... 725/27 |
| 2014/0089307 A1 | 3/2014 | Garside et al. |
| 2014/0215535 A1* | 7/2014 | Elliott ................ H04N 21/2387 725/81 |
| 2014/0248904 A1* | 9/2014 | Meredith .............. H04W 12/06 455/456.1 |
| 2015/0055014 A1* | 2/2015 | Chen et al. ..................... 348/516 |

OTHER PUBLICATIONS

Mohan, R., "Video sequence matching,"Proc. Int. Conf. Acoust., Speech and Signal Processing (ICASSP), vol. 6, pp. 3697-3700, Jan. 1998.

Oostveen, J., Kalker, T. and Haitsma, J., "Feature extraction and a database strategy for video fingerprinting," Proc. 5th Int. Conf. Recent Advance in Visual Information Systems, pp. 117-128, 2002.

Kim C. and Vasudev B., "Spatiotemporal sequence matching for efficient video copy detection," IEEE Trans. Circuits Syst. Video Technol., vol. 15, No. 1, pp. 127-132, Jan. 2005.

Lu J., "Video fingerprinting for copy identification: from research to industry applications", Proceedings of SPIE, Media Forensics and Security, vol. 7254, Feb. 2009, 15 pages.

Beauget et al. "Informed Detection of Audio Watermark for Resolving Playback Speed Modifications", Proceedings of the Multimedia and Security Workshop Ommultimedia and Security, Sep. 20, 2004, ACM, pp. 117-123.

Shih-Wei Sun et al, "Video Watermarking Synchronization Based on Profile Statistics", Oct. 14, 2003, IEEE, pp. 410-413.

Ramaswamy, "Solving the Content Identification Problem for Digital TV", SPIE Newsroom, Dec. 30, 2008, 2 pages.

\* cited by examiner

CONTENT RECOGNITION AND SYNCHRONIZATION USING LOCAL CACHING

RELATED APPLICATION DATA

This application claims benefit of provisional application No. 61/610,988, filed Mar. 14, 2012.

TECHNICAL FIELD

The invention relates to signal recognition, and in particular, signal recognition for content identification and synchronization of services with particular events within entertainment content streams.

BACKGROUND AND SUMMARY

The use of automatic content recognition (ACR) to enhance the user's experience of entertainment content is growing in popularity. Certain forms of ACR, such as digital watermarking and content fingerprinting, identify entertainment content, including TV shows, movies and songs, based on identity derived from the content signal in a format agnostic way. Robust content recognition can even identify content captured from the user's ambient environment through microphones or image sensors. These forms of recognition are referred to as "robust" because they are able to identify content specifically, despite changes that occur due to distortions incurred in the distribution channel, including channel coding like compression and digital to analog conversion. This independence from signal format and distribution channel affords flexibility and independence from the nuances and constraints of the particular means of distribution channel. It enables recognition triggered services to be delivered on an un-tethered mobile device as it samples signals from its environment through its sensors.

In a world where users get exposed to various forms of entertainment content, ACR is particularly useful when provided in connection with personal mobile devices. When connected with an ACR computing service, the user's mobile device can enhance the user's experience of content by identifying the content and providing access to a variety of related services.

ACR services have become more common with the proliferation of mobile device software markets and associated cloud services. Mobile devices and the associated cloud infrastructure provide an excellent platform for ACR. The mobile device platform is advantageous because users carry mobile devices everywhere, and these devices are often connected to networks (e.g., via wi-fi and cell networks), have multiple sensors to sense audio and visual signals around the user, and are increasingly more versatile and powerful computing devices. When coupled with additional processing power in the cloud, they can both tap the cloud's computing power to assist in identification and deliver relevant network services.

Initial ACR applications focused on providing basic song or program identification services and opportunities to buy related products and services and share information about content with friends. ACR applications have developed separately around particular content recognition functions such as music recognition, image recognition and video programming recognition. More recently, vendors of these services have sought to generalize the functionality across media types and expand the types of services triggered as a result of a recognition event.

In the television industry, for example, ACR has been used to enhance a TV viewer's experience while watching a show on a primary screen by providing associated services on the viewer's personal mobile device, dubbed the "second screen." The ACR system, in such applications, includes a mobile application that operates on the user's device, and a computing service (e.g., in the cloud) that interacts with the mobile application to provide content recognition and/or delivery of network services associated with content once it has been recognized.

At this stage of development of ACR applications in the entertainment space, functionality is limited by a number of factors. Current recognition applications are limited to operating in discrete recognition modes in which the user prompts the application to recognize a song or show, and the application proceeds to identify it and provide associated information for that single recognition event.

A more sophisticated application for enhanced TV experiences requires that the ACR system synchronize with the show. Synchronizing means that the application keeps track of relative time location where the user is in the show during the viewing experience so that it can provide time relevant experiences, such as alternative story lines, time relevant program data, social network experiences tied to particular events in a show. The time offset relative to the program start or some other time reference of a signal stream is a proxy for program events within the stream. These might be within a show or at its boundaries with other shows or advertising. Typical viewing habits introduce discontinuities in the signal stream that make efficient signal recognition and synchronization challenging for some ACR technologies, particularly content fingerprinting. These discontinuities include, for example, channel surfing, time shifted viewing of previously recorded programs, fast forwarding and rewinding through a show, etc. User behavior can be hard to predict, and one cannot require the user to tell the application what he is doing. Instead, the application should preferably operate in the background in an efficient (i.e. low power consuming) passive recognition mode, effectively maintaining accurate recognition and synchronization, even as discontinuities occur.

There are two primary forms of content recognition in use for enhanced TV experiences. One is digital watermarking, and the other is content fingerprinting. The digital watermark provides data in the content signal that enables identification and synchronization. Content fingerprinting identifies the content signal by computing a sequence of content fingerprints and matching them with a database. It is more challenging to maintain synchronization with content fingerprinting, particularly if the system is intended to operate across many different shows and deal with a variety of user behavior that causes loss of synchronization.

For content fingerprint based ACR, the system designer might attempt "brute force" solutions to the challenges posed above for content recognition. For example, the ACR system might be programmed to operate continuously, to identify the show and relative time location within the show for a large database of shows, across a wide time range, accounting for time shifting, channel surfing (or more generally switching among signal source or just walking from one room to another with different devices simultaneously spewing programs via cable, Internet, over the air, disk, etc.). However, even in today's world, this is impractical. Even while computing power is increasing on mobile devices, such as smartphones and tablets, battery life remains a significant constraint. As such, it is important to limit unnecessary processing on the device, and also, to limit significant use of the device's radio to communicate with computing resources in the cloud. Brute force identification implies that the mobile device is continuously computing fingerprints and/or sending these fingerprints and associated content signals to a fingerprint database for identification. In modes where it is desired that the application operates autonomously (without requiring the user to initiate each signal identification query), the application needs a mechanism to use processing power and radio communication sparingly, yet sufficient to provide precise timing so that applications beyond mere program identification are enabled.

DETAILED DESCRIPTION

This disclosure provides various content recognition methods for dealing with challenges associated with maintaining accurate and localized recognition while being more flexible and transparent to the user.

Figure 1:
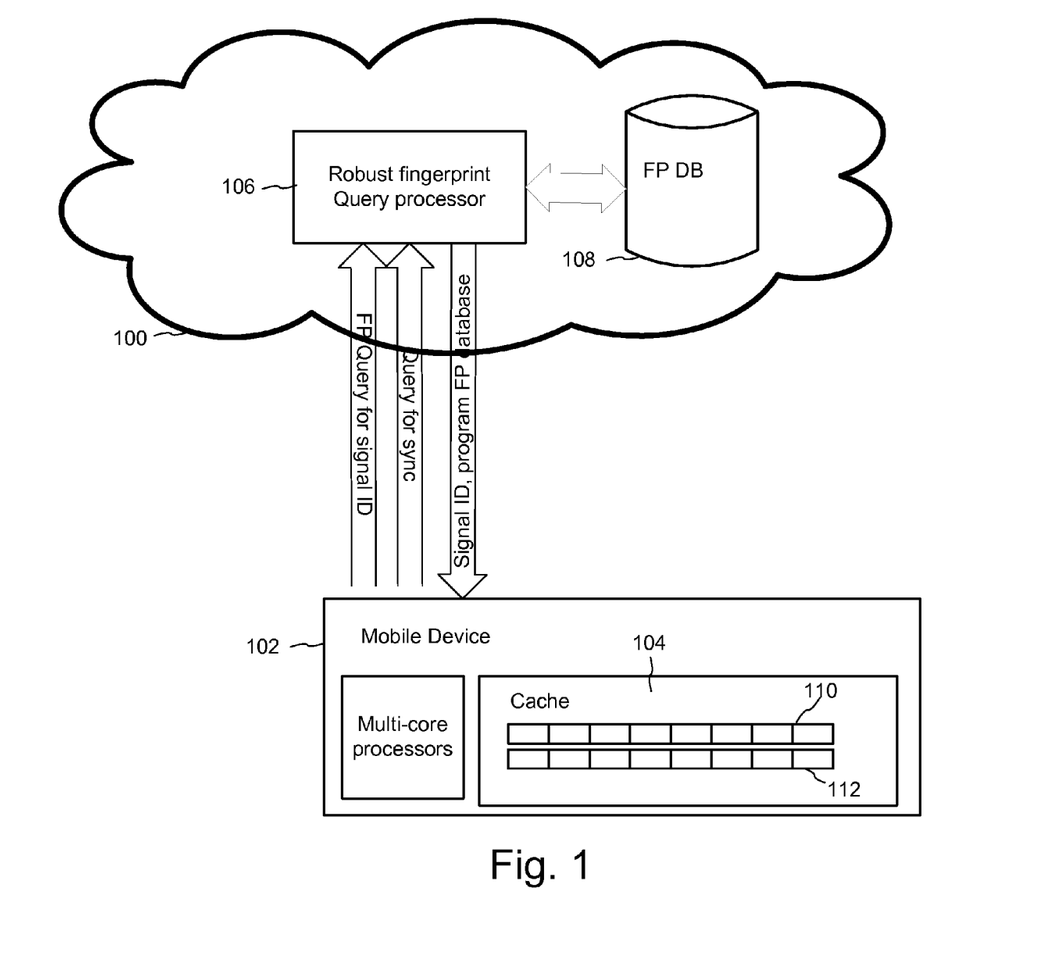
FIG. 1 is a system diagram of a content recognition system with caching of portions of a recognition database on a client device.

FIG. 1 is a system diagram of a content recognition system with caching of portions of a recognition database on a client device. To simplify the diagram, the system is decomposed into the basic elements of a network computing system 100 (e.g., a network of servers in a cloud computing system) that interacts with a client computing device 102 of the user. The details of the connection between the network system and the user device are not shown, as a myriad of network communication technologies may be used. The predominant one today is a wireless network connection in which the user device opportunistically invokes cellular and wi-fi connectivity to connect to the cloud service, but there are many other possibilities. We foresee that the preferred user device will be an untethered mobile device, and our examples, therefore, focus on mobile platforms. We also foresee that the user will likely have access to multiple devices, including both mobile and tethered within a given venue (either at home or in a public place). The user may control some subset of the devices, or at least have access to them to leverage their network connection and computing power in an ad hoc networking modality.

The trend today for the mobile device is to expand the processing capability of the device with additional processors, including general purpose processing cores (e.g., CPUs) and more specialized processors, such as Graphics Processing Units (GPUs). The mobile device also has memory including both persistent and Random Access Memory (RAM), which we generally depict as a memory system 104.

In a content fingerprinting system depicted here, the mobile device communicates with a robust fingerprint query processor 106 within the network computing system. The query processor is network software application, executing on a network of server computers. The fingerprint system comprises program modules executing on the mobile device and within the network computing system. On the user's device the modules can be part of an application program, the mobile operating system, or a combination of both. For the sake of illustration, we generalize these modules at the user's device as the client application.

In the network computing system 100 the query processor searches a fingerprint database 108 to locate matching fingerprints for a portion of a program (typically a few seconds or less) within the database for incoming fingerprints during a session. The match criteria for identification of a program are tuned to provide desired accuracy levels. In particular, it is set to achieve a statistical confidence level that the match is correct relative to target false positive and false negative rates.

In one embodiment, the client application includes a module for computing robust fingerprints from a stream of content sensed on the device. This embodiment operates on an audio stream, but similar approaches for executing precise identification can be implement on other content forms, such as a video stream (e.g., captured through the devices image sensor). The client software is launched at the beginning of a session, and it executes in the background as the user is exposed to content programming (e.g., shows on a television or other entertainment device) in his ambient environment.

The system depicted in FIG. 1 implements a fingerprint caching scheme to enable the system to manage synchronization efficiently for the user while operating in the background and adapting discontinuities in the program stream. As highlighted in the introduction, discontinuities arise from things that the user does (e.g., time shifting, fast forwarding, rewinding, skipping, starting viewing in the midst of a program, etc.), things that the broadcast system does (ad insertion, stretching or shrinking programs, other deviations from program line up, variations in live programming feeds, etc.) and variations introduced in the program stream from the ambient environment, such as other devices playing different content (either shows or songs or some combination thereof).

The caching scheme seeks to determine which program the user is predominantly giving his attention to for a relatively stable session. Once it does so, it creates an instance of a local fingerprint database for the program in the memory 104 of the user device. FIG. 1 depicts a time series of fingerprints 110, 112 for two recent programs that the user has been exposed to. Looking at series 110 for example, one can see that the fingerprints are depicted as segments within what appears to be a linear time series. Each segment in the series represents a fingerprint for a time period over which the fingerprint is calculated. The time periods may overlap, and the spacing need not be regular. Instead, the granularity can be non-linear in time, decreasing or increasing in time offset relative to neighbors. The arrangement can be tuned opportunistically based on audio signal features, or based on events in a program, such as boundaries around commercial insertion locations, key points in the plot, or product placement or other important events where synchronization is more important.

Figure 2:
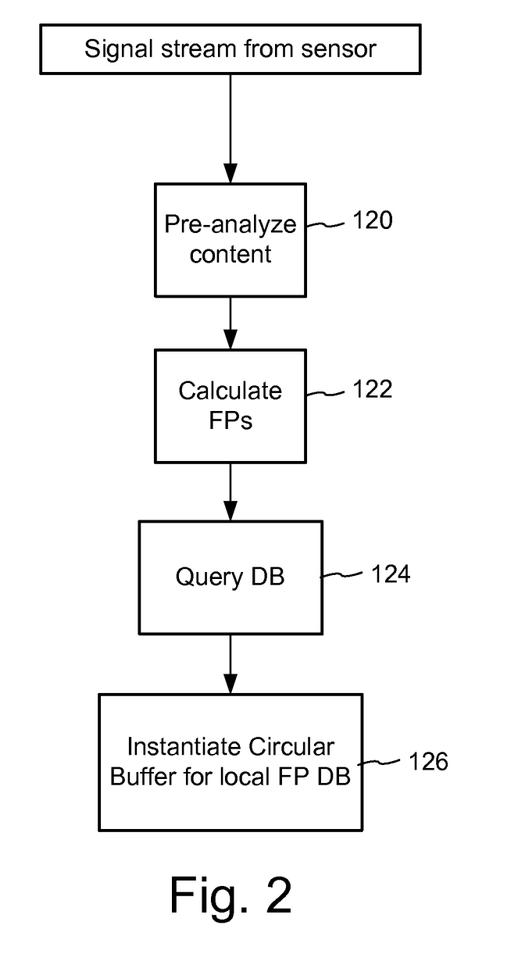
FIG. 2 is a flow diagram illustrating a method for instantiating a local cache with a fingerprint database when a program that a user device is exposed to is identified.

FIG. 2 is a flow diagram illustrating a method for instantiating the local cache with a fingerprint database for a program when the program is identified. The client application receives a digitized signal stream from the device's sensor. In the case of audio recognition, this is an audio stream from the microphone. The client application pre-analyzes the content stream (120). This includes sub-sampling the digital audio stream to generate a desired bit rate. It may also include other pre-processing dependent on the particular class of fingerprint. As explained below, the system preferably has different classes of fingerprints that are adapted to optimize system functionality for different operating modes, such as a mode to synchronize to a location within a program, and initial program identification mode. As detailed further below, different classes of fingerprint are used within an operating mode to optimize the functioning of that mode.

Next, the content recognition system calculates fingerprints for corresponding time segments of the incoming data stream (122). This may be executed by client application on the mobile device, or in a pre-processing application to the query processor in the cloud, or in a combination of both. In one implementation, the client computes fingerprints and sends them to the query processor for a search of the fingerprint database. Regardless where the fingerprints are computed, the system formulates a fingerprint database query and initiates a search of the fingerprint database (124). This query and search process continues until a match is found for fingerprints that match a particular program, indicating that a sufficient level of correlation has been achieved between the incoming fingerprints from an originating client application and those of a particular program.

Having identified a matching program, the query processor returns the program identification and associated information for the program. This associated information includes the program code and content for enhancing the experience of the program as well as a fingerprint database for the show. The client application instantiates a circular buffer in RAM of the device to store the fingerprint database for the identified program (126).

Once the show is identified and a corresponding fingerprint database instantiated locally, the client application maintains synchronization for that show by matching locally computed fingerprints from the incoming stream against the local fingerprint database. This enables the system to operate in a low power mode without need to query the network and use radio power to do so.

Figure 3:
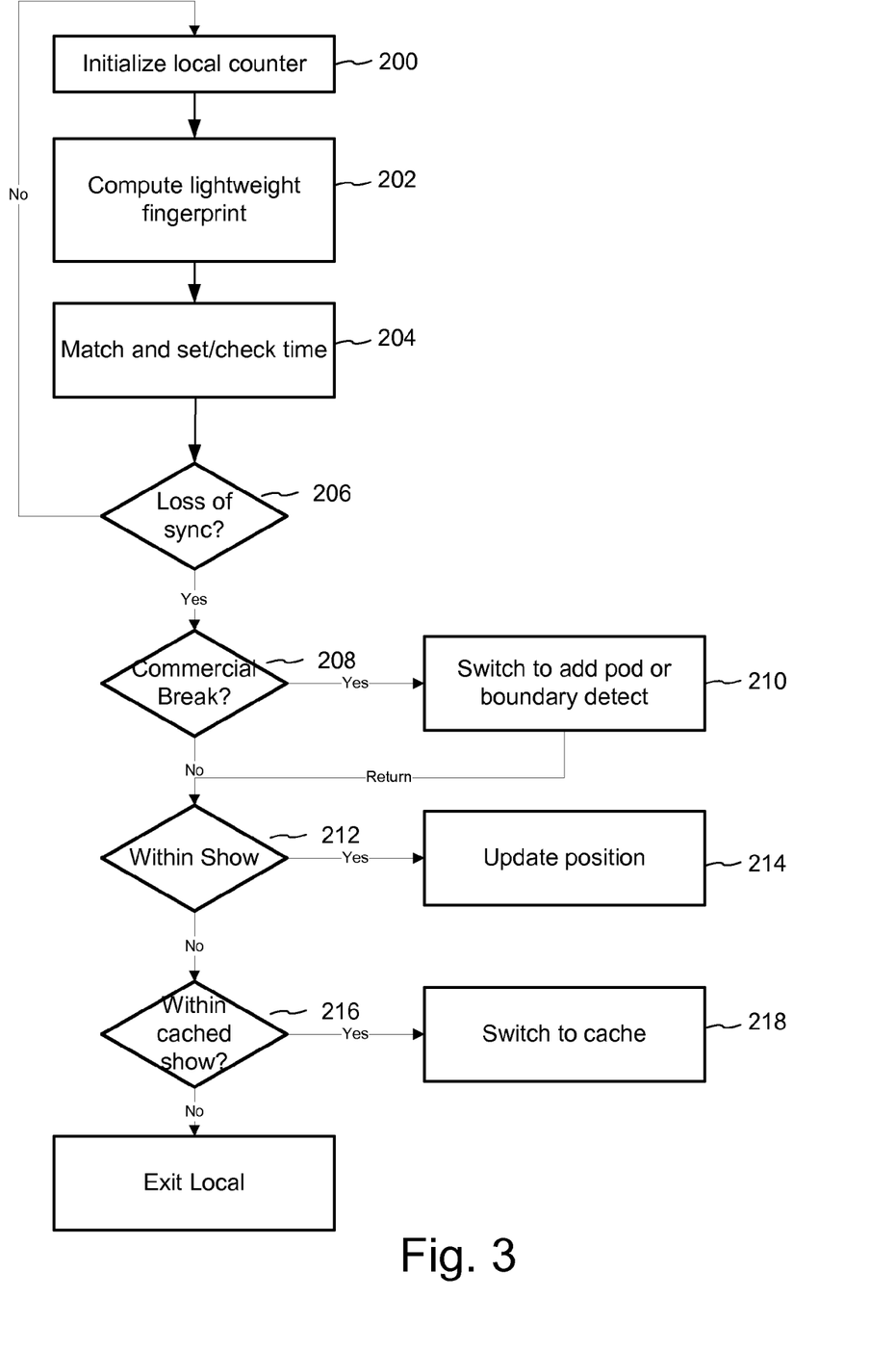
FIG. 3 is a flow diagram illustrating a method for managing synchronization using a local fingerprint database.

FIG. 3 is a flow diagram illustrating a method for managing synchronization using a local fingerprint database. The client application initiates a local counter to create a time reference against which it evaluates whether time determined from recognition is consistent with this time reference (200). The local counter provides elapsed time from a recognized time segment in the program. As noted, a variety of discontinuities can cause a mismatch between the time reference and the time derived from matching a received segment of the program with the fingerprint database.

At initialization and subsequent scheduled times thereafter, the client application computes a lightweight fingerprint (202) from content sensed by the device (e.g., for audio embodiments, the sound of the program captured by the user device's microphone). We explain lightweight further below. Generally speaking, lightweight refers to a computationally more efficient method of calculating a robust hash of a time segment of the incoming content signal, as compared to other classes of fingerprints used by the system. This is not required, but can be advantageous to reduce processing and power consumption.

The client application executes a matching process for a fingerprint in the local database (204). If a match is found, the client application provides the time offset for the content segment relative to the program start (or some suitable time reference for the program material). At initialization, the time for the first matching segment sets the point in the show at which the local counter is started. If a match is found at the next scheduled check point, the time offset for this time segment is checked against the current elapsed time from the local counter to determine whether the elapsed time on the counter is within a desired error tolerance time difference relative to the elapsed time in the program.

This comparison of program time relative to local counter time is depicted in FIG. 3 as decision block 206. From this check, the client application launches software routines to attempt to recover synchronization locally. There are a variety of possible configurations for these routines, and FIG. 3 depicts an example of one group of routines. These routines can be launched in series or in parallel, as appropriate, based on availability of multi-process/thread computing resources on the device.

A first type of loss of synchronization is due to a commercial break in the program as depicted in blocks 208 and 210. Both the time start and duration of an advertisement break can be predicted or derived directly from the associated information initially downloaded with the fingerprint database. In some implementations, a fingerprint databases for the advertisements, either known or predicted for the program, can be downloaded at the time of program recognition or thereafter. At the time of recognition, the user device may supply context data to the query processor to enable it to identify or narrow the possible sources of the content, such as the broadcaster/cable/satellite content distributor, either identified explicitly, or derived from the user's location or user viewing history or preferences. With this information, fingerprint databases for the advertisement pods associated with the program are identified and supplied to the user's device for a caching as described above. The client application can then search these fingerprint databases in response to a loss of synchronization in the show and detection that the user is likely in a commercial break.

Additionally, the client application can execute a boundary detect routine to ascertain whether the user is at the boundary of a commercial break. A boundary at the start of the commercial break can be associated with fingerprint of time segments near the break in the local fingerprint database. If synchronization is lost just after a fingerprint of a boundary segment is detected, the client application initiates one or more routines to respond. One such routine is to perform recognition on cached fingerprint databases of the ad pod as explained. Another is to prompt the user that a commercial break has been detected. For detected program times that are determined as being roughly at the time that the program is scheduled for or is in fact airing in a particular market or content distribution channel, the client application can deduce that the user is not able to skip the commercial break (e.g., via fast forward of a Digital Video Recorder (DVR) or skip ahead in a program streaming and being buffered at the user's entertainment system).

In response to detecting a break in content programming, the client application can supply services, such as executing and displaying a timer to alert the user when the program will resume. It can also be set to display information about the other programs that the user has been watching based on recent recognition events. For example, it can show which ones are not likely to be in a commercial break. Client applications integrated with the channel or DVR control can also initiate a remote control application to allow the user to switch the channel. This, of course, then provides channel identification information to the local caching system to prioritize fingerprint databases for programming or programming channels to cache locally and keep updated in the local circular buffer.

To facilitate this functionality, the fingerprint system maintains a connection to a program line up database for a variety of geographic areas and time zones. This line up database provides a database of scheduled programs and associated metadata. It can be updated with real time broadcast monitoring data to update it to reflect more accurately programs that are airing in each geographic area and time zone and by content distributor (e.g., cable and satellite operators). When programs are identified in a geographic area and time zone, the query processor also consults the program line up database based on the identified program ID from the fingerprint database and other information derived about the user's location and content distributor. This enables the system to cache relevant databases for commercial pods associated with program in the program line up. It also enables it to prioritize other programs airing at about the same time for fingerprint searching and for selecting portions of the fingerprint database to cache locally. The fingerprint databases for these programs can then be used if the system detects the user is watching one or more programs at their live or scheduled broadcast times.

Just as the system can deduce that the user is exposed to programs as they are broadcast/transmitted, it also deduces that the user is exposed to programs in time shifted mode. In particular, when a program is identified, and the time of identification does not correspond to the broadcast time, it is likely being viewed in time shifted mode. Alternative or supporting modes of detecting time shifted mode include detection from direct or indirect input from the time shifting system. For example, the mobile device can detect that the user is fast forwarding by recognizing the tone of the fast forward function on the DVR through the sensed audio input. It can also detect this behavior via inter-process software communication with the DVR software.

Preferably, the system monitors the timing pattern of recognition events to deduce time shifted viewing. This can be executed at the network level by tracking user sessions, at the client application level, or through a cooperation of the client and network software of the recognition system. In particular, by tracking the time offsets from matched fingerprints relative to local device time for each show being viewed, the client application identifies a pattern of time segments of a program that the user is exposed to. Skipping of commercials emerges as a distinct pattern because the local elapsed time for a commercial break is compressed well below the actual commercial break time in the data set of recognized program segment times against local time.

Detection of time shifted mode implies that the client application will be more efficient if it adapts its recognition heuristics for this mode. If the user is watching a program in time shifted mode, the user is less likely to switch among channels or programs. Once evidence of time shifted mode is detected, the client application biases its operation toward this mode. One implication of this mode is that the client application should call ahead to make sure it has the fingerprint database for future parts of the show, in the event that it has not already obtained them in the initial download at the time of initial program identification. Another implication is that the supplemental program material that is downloaded with the fingerprint database can be tailored to the tastes of users that watch the program in time shifted mode. This could involve more in depth post game analysis that is not available during a live telecast, variations in the plot of the show that vary as a function of time elapsed since the initial airing to encourage more engagement. Ad placement code downloaded to the client can also be adapted to the user watching the program in time shifted mode. For example, it could be correlated more closely with events in the show that are less likely to be skipped, such as the end of show where the plot is resolved, or reality show winners are announced, etc.

Another implication of time shifted mode is that management of the local cache is further adapted to it. First, as noted, the user can be expected to channel surf less. Second, the system can recall from viewing history that the user is likely to watch other shows that he has viewed in time shifted mode. As a result of these expectations, solidified by observing actual user behavior, the client application prioritizes shows for local caching according to the collection of shows that the user has previously watched in time shifted mode.

We now return to FIG. 3 to illustrate examples of these approaches to managing synchronization and local caching. Blocks 212 and 214 depict the client operation of prioritizing the fingerprint match to within the same program when synchronization is lost. If the elapsed time on the local counter does not correspond to the elapsed program time as determined from the process of block 204, the client application attempts to regain synchronization. If there is a fingerprint match but not at the expected time, then the client application re-initializes the local counter and attempts to maintain synchronization from that point in the show. This re-initialization may preferably occur after a sequence of successful matches for incoming content to ensure that the user behavior has settled to a state where there are not discontinuities.

As part of this process, the client application can also signal the query processor to download additional fingerprint databases, including later in the same show and/or the subsequent show in the program line up.

In the event that the client application finds that the user appears to have left the show, it also checks the local caches for other shows that have been downloaded as shown in blocks 216 and 218. Upon successful recognition of a fingerprint in another cache, the client application notifies the query processor that the user has switched. In response, the query process downloads updated fingerprint data for that show if not present in the local device. It also updates its session record with this event so that it can prioritize subsequent fingerprint queries from the client based on the user's history for that session.

If the client is unable to successfully make a local match, even after updating the caches, it returns to program identification mode as described above in connection with FIG. 2. The process of updating the local caches generally follows a circular buffer scheme. Under this scheme, the client application queries (or the network pushes) the most recent fingerprint database for the programs in the user's local cache. Variations of this general approach are to increase or decrease the rate of updates based on user behavior derived from monitoring recognition events. As noted above, the stability of the viewing behavior is tracked by frequency of returns to the program identification phase of FIG. 2, evidencing channel surfing, and mapping program elapsed time against local elapsed time to identify shows that the user is watching more continuously, evidencing greater interest through the synchronization phase of FIG. 3.

Further, detection of time shifted mode has different caching implications than detection of the user watching live or currently telecast program events. The caching for time shifted mode is adapted to update the cache so that it is up to date in the event that the user time shifts within show (or switches to another time shifted show). This means that the local cache is updated with the complete fingerprint database for the current time shifted show, and high priority favorite shows that the user has watched in previous sessions that were determined to be time shifted viewing sessions. This approach puts the local device in a position to re-establish synchronization for a show, whether the user fast forwards or rewinds within the show. For live or near time of telecast viewing, the cache updating is driven based on initial program identification at channel switches and correlation with previous behavior by this user and current behavior of like users watching similar programs. As the system tracks viewing patterns on a user history and current like user behavioral basis, it is able to update each program with other programs that are most likely to be viewed along with it. This tracking and updating of the relational data associated with the show is further broken down by geographic area/time zone, user demographic, subscriber base for a particular distributor, etc. Thus, when a program is identified, the system provides the fingerprint database for that program and the most likely programs that the user is going to watch along with it based on querying the database for the shows linked to the identified program and associated with the user's viewing profile or demographic.

As a point of clarification, it should be note that the fingerprint databases are generated based on live program feeds. There is a typical broadcast delay, but this delay may not encompass the system latency caused by the need to compute fingerprints from the live program feed and establish the fingerprint database for these live feeds in the fingerprint database. In this case, the client application either calls for, or the network application pushes, fingerprint updates to the client for the fingerprint database of the live program that the user is recognized as currently watching. As noted, since the system knows that the program is live, there are predictable behaviors such as channel surfing at commercials that the system predicts, detects and then addresses with a variety of routines to assist the user's selection of other programs, assist with recognition of advertisements by downloading the fingerprint database for the local advertisement pod of the user's viewing area and/or distributor to increase the changes of engaging the user during a break in the main program's action.

Above, it has been noted that the system employs a session paradigm to track user requests for program information. This session paradigm enables the system to optimize performance in several ways. First, if the user allows it, the user's viewing preference is derived from his sessions. Second, during a session, the state information provided by the queries back and forth with the client enable the system to optimize the fingerprint match. The database search is optimized by segmenting the database into portions that correspond to programs that the user is most likely to watch, both as a result of the current session, and then correlation of that session with the user's prior sessions and like viewer's sessions. When synchronization is lost, the session allows the system to prioritize which portion of the database it will search, and which portion of the database it will download to the user's device based on coarse matching at the network level (e.g., lesser confident matches, yet still useful in narrowing the database).

The session approach also allows the network and client to operate in parallel to reduce power consumption and bandwidth usage. This is achieved by downloading high priority portions of the fingerprint database to the user's device as explained and then minimizing communication with the client until needed. During this quiet period, the network continues to update the user's session without communication with the client based on monitoring queries from other users that have like session state information (like programs watched, queries made, etc.). As this session is updated with most likely programs that the user may watch based on session analysis, the network is ready for the next query from the device indicating that it needs help recognizing a program or recognizing a segment within a program. When that query arrives, the network gets the update in device state from the client and matches it with its updated state for this user's session and like session state of other user's. It sends the updated data that it has been associating with the user's session, adapted as necessary for any updates learned about the mobile device from the recent query.

The session approach further enables a distributed model for transferring fingerprint data to client devices. In particular, using peer to peer protocols, each client becomes a peer to other clients. Peers with like session state share fingerprint database portions, which provides an efficient means to distribute the fingerprint database to local caches. The session information allows clients and/or the network service to identify users watching similar programs, possibly on network connections that offer less expensive, and/or more bandwidth for transmitting fingerprint data and program metadata tied to it.

Data mining of user sessions provides a wealth of audience measurement data that can be mined to tune the performance of the fingerprint database search process through database segmentation, and to tune cache management by prioritizing shows for caching.

At the time of this application, the state of content fingerprinting is relatively advanced for audio, video and still images. It is in use for content recognition of music and TV programming. Some examples of fingerprint technology that may be used with the above schemes are described in U.S. Pat. Nos. 7,174,293, 7,346,512, 6,990,453 and U.S. Patent Publication 20020178410, which are hereby incorporated by reference.

The above techniques can be used to make existing content fingerprint systems better in several ways as explained above. These include the ability to support an "always on" recognition mode efficiently on battery operated phones and tablets, where the user's device can operate in the background, sensing ambient content and providing user services with efficient use of power on the device and efficient use of bandwidth (through cell phone network, wi-fi or other radio communication). In addition to using these techniques to optimize operation of existing fingerprint schemes, we have developed further improvements to the state of the fingerprinting art. One such improvement is to employ different classes of content fingerprints, and use different classes advantageously for different operating modes. For the sake of illustration, we describe this approach for audio content. These schemes may be adapted to video fingerprint schemes as well.

The use of different fingerprint classes enables the system to optimize between tradeoffs as it performs recognition in different operating modes. There are often tradeoffs between computational expense of calculating the fingerprints, the size of the fingerprint features, specificity of the fingerprints, robustness of the fingerprints, false positives, and the computational expense incurred in performing the matching against a fingerprint database. For example, if the fingerprint features are extremely detailed, they can provide excellent specificity at the cost of more computation and possible reduction in robustness against ambient noise. Note that higher specificity within a unit of time implies less audio data that needs to be processed before providing an answer to the user. On the other hand, if the features are coarse, they can have higher robustness and lower computation but would need a longer length of audio before a match can be ascertained.

One solution to these tradeoffs is to design multiple features that have different properties and advantages. For example, a first set of features are chosen to be lightweight in computation, and require a small amount of audio (e.g., 5-10 s). The purpose of these features is to narrow the database search at the remote server (the network application shown in FIG. 1). This creates a list of most likely matching programs at the server, which each are represented by a program identifier (ID). At this point a second set of features with enhanced temporal specificity corresponding to this list of IDs is sent to the mobile device (features corresponding to the most likely program ID first) and stored in a local cache for use in the synchronization management stage. Concurrent to the computation of the first set of features on the mobile device, a second set of features is also computed for matching with the features transmitted by the server.

This matching is lightweight and is performed on the mobile device to manage synchronization. First, this lightweight matching is used to detect and set the initial program reference time. As the client application senses incoming audio captured from the device's microphone, it time stamps it with a local device clock time to provide a time measurement of when the mobile device sensed the program's audio from the ambient environment. Temporal matches based on a correlation of the incoming lightweight fingerprints and reference fingerprints are found and time stamped at the time of match with local clock time to correct for latency between sensing and matching in local device time. The program time offset associated with the matching reference features in the fingerprint database is stored along with a reference to the sensed time of the audio segment containing those features. The local clock is then used to provide a local count of elapsed time relative to the sensed time of the audio that provided the initial feature match. The time of subsequent matches is similarly corrected for latency and its corresponding program time offset is checked to determine whether the elapsed program time is consistent with the elapsed local time.

Once the ID and temporal matches are determined, further synchronization is enabled by a "send ahead" approach where the second set of features is pre-sent to the mobile device from the server to keep the circular buffer of the local cache updated. Occasionally a match is performed with the first set of features as before to ensure that the user has not tuned to different content. This could be done when there is a mismatch in the second set of features.

We now describe a software embodiment of our fingerprint recognition system in more detail. The system is divided into two main stages: Feature Extraction and Matching stages. Feature extraction is the process of extracting robust hashes that form the fingerprint for a time segment of audio. Matching is the process of searching a corresponding database for a matching reference fingerprints. In the recognition application above, these stages are divided among the client device and network service and used differently depending on fingerprint class and operating mode as noted.

Matching is divided into multiple sub-stages. Currently two sub-stages are used for initial program identification, Search Space Reduction and Detailed Matching. In the Search Space Reduction sub-stage, the reference audio database is quickly partitioned into a small subset for faster matching.

In the Detailed Matching sub stage, the system uses multiple features for recognition. These features are extracted in the Feature Extraction stage. During recognition, different features extract different characteristics of the underlying audio signal and complement each other for the purpose of initial program recognition. Multiple features provide flexibility and redundancy.

Currently, two sets of features are used—Spatiotemporal (change in spectral content across frequency and time) and Temporal (change in spectral content across time).

One set of features has more specificity than the other—this overcomes the tradeoff between the desire for less specificity to overcome distortions and the desire for more specificity to avoid false positives.

The system employs individual databases for each feature. Since the features have different characteristics (specificity, size, scalability, noise tolerance, etc.), and are used in different stages, placing each feature type in an individual database is advantageous. The database implementation and configurations are then optimized to suit the underlying task the features are used are (for example, speed of access, size of the database, scalability, flexibility, cost, etc. can drive database design).

For feature extraction, the system is set up to be flexible to allow arbitrary sampling frequencies, FFT lengths, and frame overlaps. Details of currently used parameters are given below. The system re-samples the audio data at 11025 Hz. A higher sampling frequency provides better recognition accuracy. The system employs a Hanning windowed FFT of length 2048 samples, and an overlap of 1792 samples between consecutive frames.

Non-linear processing is performed on the spectrum to enhance recognition. A simple non-linear function is a power function (i.e., each spectral value raised to a floating point number). The desired non-linearity is chosen empirically from representative data.

The spectrum data of incoming audio segment obtained from the above processing is partitioned into overlapping frequency regions or bands, with the latter part (around half) of the spectrum discarded to provide improved recognition with ambient audio capture on mobile devices (such as smartphones like the Apple iPhone, or Tablet computing devices like the Apple iPad).

Spectral values in each partition are summed using a Gaussian weighting function. The distribution of this weighting function is chosen carefully using a data-driven process to ensure maximum robustness. The result of applying the Gaussian weights is a spectral feature vector with each value corresponding to the Gaussian weighted sum in a partition (i.e., band).

Analysis of ambient captured audio data shows that uniformly spaced partitions with Gaussian weighting functions provide much better recognition accuracy than the traditionally used Bark frequency scaling to obtain features in Bark bands.

The number of bands is currently set at 16 for efficiency, although any other number of bands such as 24 or 32 could be used as well.

Spatiotemporal signatures or features are calculated from consecutive pairs of spectral feature vectors as suggested in literature describing existing systems, such as 20020178410. A spatiotemporal signature is a 16 bit value.

Temporal signatures are calculated by taking the differences between consecutive spectral bands in time. The signature value is 1 if the difference is positive, 0 otherwise. A temporal signature is a 16 bit value.

The Search Space Reduction sub-stage reduces the size of the database for subsequent detailed matching. In the software architecture of our system, the Search Space Reduction sub-stage is uncoupled with the actual signature features used. Consequently, the system is flexible enough to accommodate any feature set with desired specificity.

We use temporal signatures as a coarse match for Search Space reduction and then spatiotemporal signatures for a detailed matching for program identification. A similar, yet higher temporal granularity set of features is used to manage synchronization at the mobile device.

Digital watermarks may be used in combination with the above methods for synchronization. Digital watermarks in the audio or video provide various forms of information that can be extracted from ambient capture of the audio output or video display, or in-line detection from the electronic video or audio signal in a video or audio receiver. For example, the digital watermark may convey an identifier of the distribution source or broadcaster, program identifier, time stamp, etc. Each of these pieces of information may be layered into a digital watermark channel embedded in the audio or video signal. The rate at which these pieces of information are updated in the signal typically varies. The source identifier, for example, may be repeated throughout the signal, while the program ID varies with the program or commercial, and the time stamp varies more frequently to provide a time reference within the program. Regardless of the rate and granularity of this information, the robustness of the watermark may be such that a relatively large portion of audio or video (e.g., a few seconds, or even more) is needed to extract it reliably (particularly in ambient detection where background noise is mixed with the watermarked signal). Nevertheless, the watermark decoding may be executed in parallel or opportunistically within a receiver to augment the information that the receiving device derives about the program. In some modalities, the deterministic nature of the watermark provides a quicker resolution of this information, than the time taken to find a fingerprint match, particularly is the fingerprint cache does not have a match.

U.S. Pat. No. 8,300,884, which is hereby incorporated by reference in its entirety, describes methods for using watermarks in combination with fingerprints to provide granularity of timing or location within a signal. These methods include use of the watermark to provide more general identification of a program or source, and then more granular localization within the program by fingerprint matching, using a smaller fingerprint database for that program. They also include the converse case, where a fingerprint provides more general identification, and time codes in the watermark provide more granular localization. All of these principles may be used in various combinations to assist in synchronization scenarios described in this document.

Some examples will help illustrate this point. One example is to invoke watermark detection, e.g., within the mobile device, when synchronization is lost. Detection of the watermark payload (either a program ID, or source ID+time stamp) provides data from which the program is identified directly or indirectly through indexing a program line-up data base with source ID and time stamp. This indicates, for instance, whether the viewer is watching an advertisement within the same program (to which the system was synched before synch was lost), or has started channel surfing. If a time stamp is also decoded from the watermark, it provides a time reference to re-establish synchronization. Thus, watermark decoding provides the ability to re-synch efficiently in each of these cases, as it provides information to constrain the fingerprint search space and allows the fingerprint caching to be updated according to the channel or program, and the decoded time stamp, if available. It also provides the additional benefit of identifying instances of a particular advertisement, which a fingerprint cannot differentiate when the signals are identical.

The watermark provides information generally not attainable, or more difficult or expensive to obtain from fingerprinting systems. It provides attribution of source (who was the distributor that sent that advertisement or program copy). It provides any other information that is unique to the instance of a signal, such other attributes of the particular circumstances of the distribution of that signal to the user, which are otherwise not available or lost in fingerprint recognition when the content is time-shifted or re-distributed in a different channel and/or territory. It is possible for non-watermark based systems to recover some of this instance specific information through contextual information, such as the time and place and channel that a device is tuned or connected to at capture or viewing/listening by the user. This context is provided by a tuner, DVR, set top box, clock or GPS within the user device, or to which the device is connected. However, if the content has been re-distributed or time shifted, this information may not correctly correspond to the original distributor, to whom attribution may be needed for various business models. Attribution, for example, is needed for determining payment for advertisement revenue sharing, as well as payment for transaction based fees, where the user's consumption or use of the content requires payment or leads to the purchase of a product or service linked to the program.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method comprising:
   from a processor within a device, querying a content recognition database to determine program identification;
   obtaining through a network connection and caching locally in a memory of the device a local fingerprint database for a program associated with the program identification, the local fingerprint database including audio fingerprints for segments of the program and program times for associated audio fingerprints in the local fingerprint database;
   with a processor operating on an electronic audio signal sensed from ambient audio by a microphone of the device, extracting audio features from incoming segments of the electronic audio signal, and forming fingerprints for the incoming segments from audio features extracted from corresponding segments;
   with a processor, matching the fingerprints for the incoming segments with audio fingerprints for the program in the local fingerprint database in the memory of the device, and responsive to detecting matches between fingerprints for incoming segments and matching audio fingerprints in the local fingerprint database, obtaining from the local fingerprint database program times corresponding to the matching audio fingerprints; and
   with a processor, tracking the program times relative to a time reference in the device to keep track of where a user is within the program as the device is exposed to audio of the program.

2. The method of claim 1 wherein the tracking comprises tracking the program times relative to elapsed time from a first program time corresponding to a first matching audio fingerprint.

3. The method of claim 2 including:
with a processor, synchronizing auxiliary services on the device with events in the program as determined from the elapsed time within the device.

4. The method of claim 1 wherein the matching is used to detect a discontinuity in a user's exposure to a program.

5. The method of claim 1 wherein the matching is used to detect time shifting, and with a processor, downloading supplemental material that is configured for time shifted mode, and synchronizing the supplemental material with program events based on the tracking.

6. The method of claim 4 wherein the discontinuity comprises a switch to a different program.

7. The method of claim 1 wherein the content recognition database comprises a fingerprint database of fingerprints having a first temporal granularity, wherein the local fingerprint database comprises fingerprints having a second temporal granularity, the second temporal granularity being higher than the first temporal granularity.

8. A device comprising:
a microphone;
a memory;
a radio for connecting to a network service through a cellular or wi-fi network;
one or more processors, programmed to:
query through the cellular or wi-fi network a content recognition database of the network service to determine program identification;
obtain through a network connection to the network service and cache locally in the memory of the device a local fingerprint database for a program associated with the program identification, the local fingerprint database including audio fingerprints for segments of the program and program times for associated audio fingerprints in the local fingerprint database;
operate on an electronic audio signal sensed from ambient audio by the microphone of the device to extract audio features from incoming segments of the electronic audio signal, and to form fingerprints for the incoming segments from audio features extracted from corresponding segments;
match the fingerprints for the incoming segments with audio fingerprints for the program in the local fingerprint database in the memory to determine matching audio fingerprints;
obtain from the local fingerprint database program times corresponding to the matching audio fingerprints; and
track the program times relative to a time reference in the device to keep track of where a user is within the program as the device is exposed to audio of the program.

9. The device of claim 8 including a processor configured to track the program times relative to elapsed time from a first program time corresponding to a first matching audio fingerprint.

10. The device of claim 9 including a processor configured to synchronize auxiliary services on the device with events in the program as determined from the elapsed time within the device.

11. The device of claim 9 including a processor configured to detect a discontinuity in a user's exposure to a program based on data associated with the matching audio fingerprints in the local fingerprint database.

12. The device of claim 11 wherein the discontinuity comprises a switch to a different program.

13. The device of claim 8 including a processor configured to detect time shifting from data associated with the matching audio fingerprints, configured to download supplemental material that is configured for time shifted mode, and configured to synchronize the supplemental material with program events based on the tracking.

14. The device of claim 8 wherein the content recognition database comprises a fingerprint database of fingerprints having a first temporal granularity, wherein the local fingerprint database comprises fingerprints having a second temporal granularity, the second temporal granularity being higher than the first temporal granularity.

* * * * *